United States Patent [19]

Esakov

[11] Patent Number: 4,458,855
[45] Date of Patent: Jul. 10, 1984

[54] INERTIA SPINNING REEL

[76] Inventor: Alexei Y. Esakov, prospekt Mira, 58, kv. 55, Moscow, U.S.S.R.

[21] Appl. No.: 957,883

[22] Filed: Nov. 6, 1978

[51] Int. Cl.[3] ........................................... A01K 89/017
[52] U.S. Cl. ............................... 242/84.3; 242/84.5 R
[58] Field of Search .......... 242/84.3, 84.5 R, 84.51 R, 242/107 R, 99

[56] References Cited

U.S. PATENT DOCUMENTS

| | | | |
|---|---|---|---|
| 1,496,195 | 6/1924 | Adams | 242/84.3 |
| 2,910,252 | 10/1959 | Joy | 242/84.3 |
| 3,190,578 | 6/1965 | Kondo | 242/84.3X |

Primary Examiner—Billy S. Taylor
Attorney, Agent, or Firm—Lilling & Greenspan

[57] ABSTRACT

The present invention is intended for amateur angling and mainly for use by one-arm invalids.

The spinning reel comprises a body with a base secured on which is a central spindle carrying a bushing with a toothed flange and a spool with a fishing line, said spool being slipped on said bushing. Installed in the central portion of the spool is a helical spring, one end of which is secured on the spool and the other end of which is connected with the bushing.

Mounted between the spool and the base is a disc, on one side of which (the side facing the base) a gear interacting with a catch secured on the base is mounted. The other side being provided with a spring-loaded pawl which engages the toothed flange of the bushing.

When the line with the lure is being cast into the water, the spool rotates together with the bushing and the disc.

When letting out the line, the disc is fixed in a stationary position and the end of the fishing rod is alternately lowered and lifted, thereby slackening and tensioning the line. When the rod is lifted, the spring in the spool is twisted up; during lowering of the rod it is untwisted, thereby rotating the spool in the opposite direction and thus assisting in winding the line on the spool.

3 Claims, 5 Drawing Figures

INERTIA SPINNING REEL

FIELD OF THE INVENTION

The present invention relates to fishing and, more particularly, to inertia spinning reels used for amateur fishing.

The present invention will render the most efficient service to one-arm invalids, as well as to all other anglers.

DESCRIPTION OF THE PRIOR ART

Known in the prior art is an inertia fishing reel comprising a protective body with a base, adapted for fastening to the fishing rod. Secured in the center of the body base is a spindle carrying a spool with a handle for winding up the fishing line. One of the spool sides, the one directed towards the base, carries a gear interacting with a springloaded catch installed on the base.

When the bait (lure) and the hook secured to the line are cast into water, the line starts unwinding and sets the spool in rotation. As soon as the lure touches the water, its flight stops and the line stops unwinding. The angler rotates the spool handle with its free hand and tensions the line. The angler rotates the spool handle and periodically pulls back the bait; having caught a fish he pulls said fish to the shore. In the course of fishing the angler must transfer the fishing rod many times from one hand into the other.

The above-described spinning reel possesses a number of serious disadvantages, the most important of them being the necessity of using both hands in the course of angling which makes the use of this reel difficult for invalids having only one arm.

Besides, the spinning reel of this type cannot be used for stopping at a predetermined spot the flight of the lure cast into the water, neither can it be employed for throwing the lure over such obstacles as logs, boulders protruding from the water, brushwood, stumps, etc.

SUMMARY OF THE INVENTION

An object of the present invention lies in facilitating the use of the spinning reel.

Another object of the present invention is to provide a general-purpose spinning reel which could be adapted for various methods of angling.

These and other objects are achieved by providing an inertia spinning reel comprising a body with a base secured to the fishing rod and a central spindle carrying a spool for winding up the fishing line. A gear is located between the spool and the base and interacts with a spring-loaded catch secured on the base. According to the invention, the spool is free-mounted on a bushing with a toothed flange, said bushing being slipped on said spindle. The central portion of the spool has a circular recess accommodating a helical spring, one end of which is connected to the spool and the other end of which is connected to said bushing. There is a disc installed between the spool and the base, one side of said disc (the side facing the spool) carries a spring-loaded pawl interacting with the toothed flange of said bushing and the other side of the disc (the side facing the base) carries said gear.

The present invention facilitates considerably the process of angling. This is achieved due to the provision of the spring built into the spool; when the fishing line is tensioned, this spring is compressed; during slackening of the line the spring extends, thus assisting in rotation of the spool and winding up of the line.

This ensures automatic winding of the line which is essential during angling with the use of the spinning reel, particularly for one-arm invalids since it allows the fishing process to be performed with one arm.

The spinning reel according to the present invention allows the lure to be dragged over the bottom of the water basin at any distance from the bottom, also over the water surface.

It should be most strongly emphasized that the intermittent movement of the lure occasioned during winding of the line on the spool simulates the natural motion of a swimming fish which helps substantially in its catching.

When the lure on the line is cast into water, the angler can stop the flight of the lure at any desired point.

To adjust the force of the catch spring to suit the weight of the lure it is expedient that the catch should be provided with an adjusting screw.

In one of the embodiments of the invention the body base is mounted with a spring-loaded stop with a handle and the outer surface of the disc is provided with recesses interacting with said stop.

This stop permits the flight of the bait (lure) to be stopped at the desired point.

Thus it becomes possible to cast the lure from the river-bank grown with brushwood and to throw it over various obstacles such as logs, boulders, stumps, etc.

For winding up the line, the reel according to the invention can be used as a conventional reel by rotating the drum handle clockwise.

In another embodiment of the invention the outer cylindrical surface of the bushing is provided with a longitudinal slot receiving one of the ends of the helical spring.

Other objects and advantages of the present invention will become apparent from the detailed description of its embodiment with reference to the accompanying drawings in which:

DETAILED DESCRIPTION OF THE INVENTION

Figure 1:
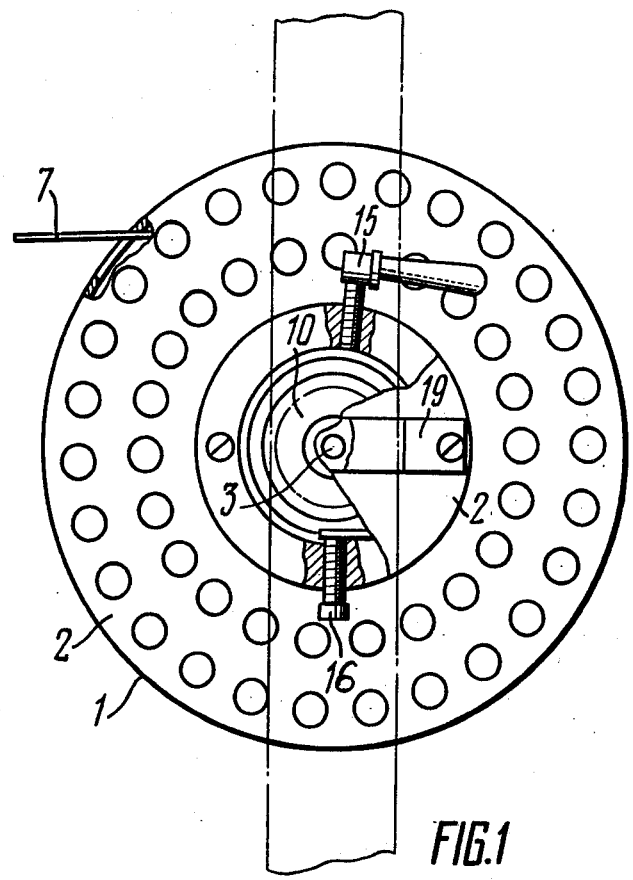
FIG. 1 is a side view of the spinning reel according to the invention.
Figure 2:
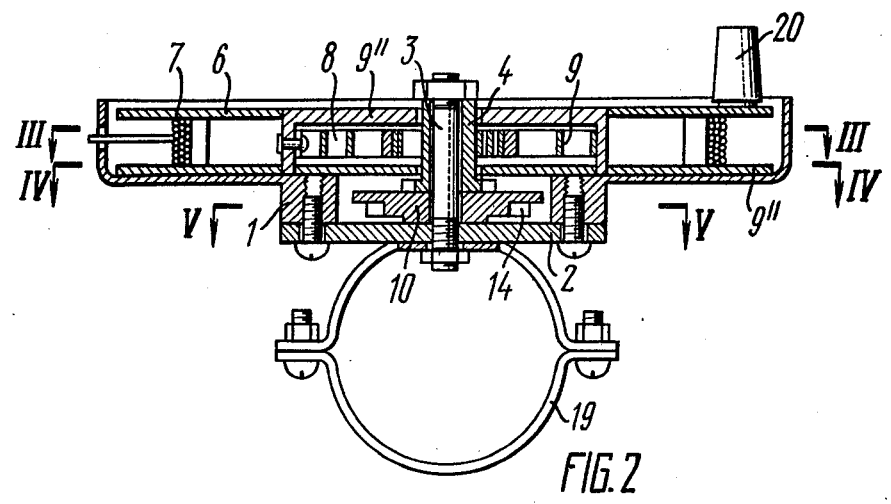
FIG. 2 is a top view of the spinning reel, partially in cross section.
Figure 3:
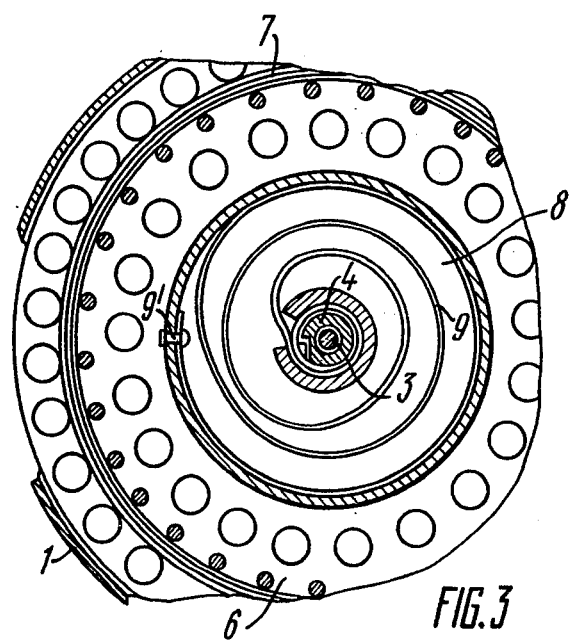
FIG. 3 is a section taken along the line III—III in FIG. 2.
Figure 4:
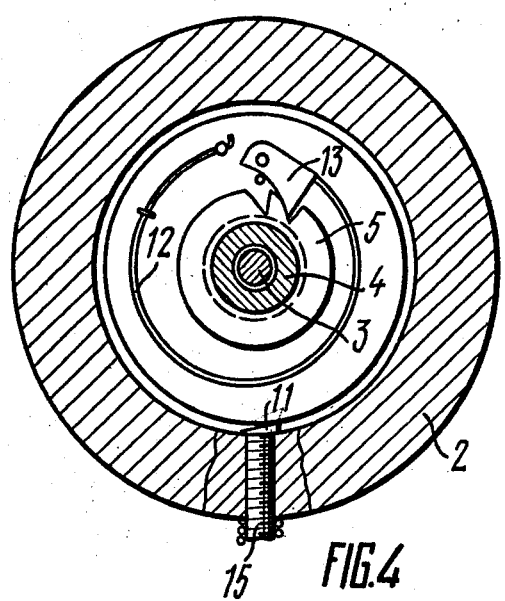
FIG. 4 is a section taken along the line IV—IV in FIG. 2.
Figure 5:
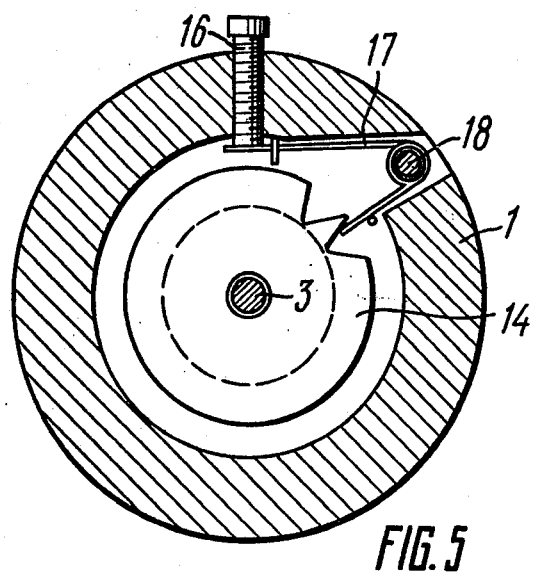
FIG. 5 is a section taken along the line V—V in FIG. 2.

The spinning reel according to the invention comprises a body 1 (FIGS. 1-5) with a base 2 and a centrally-mounted spindle 3 carrying a bushing 4 with a toothed flange 5 and a longitudinal slot on its outer cylindrical surface. Free-mounted on the bushing 4 is a spool 6 for winding up the fishing line 7. The central portion of the spool 6 has a circular recess 8 accommodating a helical spring 9, one end of which enters said slot of the bushing 4 and the other end of which is secured by a screw 9' on the spool 6. As shown in FIG. 3 one end of the spring is bent and is held in place in the slot of the bushing 4 by the action of the wound spring. In the embodiment of the invention described herein the spring 9 is made of hardened steel 0.3 mm thick and 10 cm long. The recess 8 with the spring 9 is closed by a cover 9″.

Installed between the bushing 4 and the base 2 on the spindle 3 is a disc 10 with recesses 11 on its periphery. The side of the disc 10 facing the spool 6 mounts a pawl 13 loaded by a spring 12, said pawl engaging the toothed flange 5; the other side of the disc 10 carries a gear 14.

A spring-loaded stop 15 with a handle secured on the base 2 interacts with the recesses 11 of the disc 10. The force of the spring of the stop 15 can be adjusted by a screw 16. Besides, installed on the base 2 is a spring-loaded catch 17 interacting with the gear 14. The force of the spring of the catch 17 is adjusted in accordance with the weight of the fishing line 7 by means of a screw 18. Turning the screw 18 clockwise compresses the spring of the catch 17 and diminishes the line casting distance; conversely, turning the screw 18 counter-clockwise increases the casting distance of the fishing line 7.

The body 1 is provided with a clamp 19 for securing the spinning reel to the fishing rod (not shown in the drawing). The clamp 19 can be substituted for by any other device suitable for this purpose. The spool 6 is provided with a handle 20.

The spinning reel according to the invention functions as follows.

Before casting the line 7 into the water, the angler presses the handle of the stop 15 with a finger and said stop comes out of engagement with the recesses 11 of the disc 10. During casting of the line 7 the spool 6 rotates together with the bushing 4 and the disc 10. The line 7 being pulled by the lure comes easily off the spool 6 and the spring-loaded catch 17 jumps over the teeth of the gear 14, thereby braking the spool 6 and preventing it from unwinding faster than the unwinding speed of the line 7.

While the line 7 with the lure is being cast, the spring 9 accommodated in the recess 8 of the spool 6 is twisted up (compressed). As soon as the lure touches the water, the angler releases pressure on the handle of the stop 15; the stop 15 comes to bear against one of the recesses 11 of the disc 10 thereby causing the disc and the spool 6 to stop rotating; the spring 9 extends and rotates the spool 6 in the opposite direction, taking up the line 7 partly and tensioning it.

As the fishing rod with the spinning reel is lifted, the line 7 becomes tensioned and rotates the spool 6, thereby twisting the spring 9. This happens because the stop 15 is in engagement with the disc 10 and fixes the disc 10. In its turn, the pawl 13 secured on the disc 10 bears against one of the teeth of the toothed flange 5 of the bushing 4, fixing the bushing 4 in a stationary position.

When the fishing rod is lowered, the tension of the line 7 diminishes, the spring 9 untwists and rotates the spool 6 with the bushing in the opposite direction. The line 7 is wound on the spool 6. It should be noted that the spool 6 continues rotating due to inertia some time after complete untwisting of the spring 9 thus assisting in the winding up of the line 7.

Thus, by swinging the fishing rod, i.e. by alternately slackening and tensioning the line 7, it is possible to wind the line 7 on the spool 6.

In the process of angling with the use of the spinning reel according to the invention the bait (lure) moves in the following manner.

After casting the lure with the line 7 into the water and as soon as the lure touches the water, the angler starts alternately lifting and lowering the end of the fishing rod within a range of, say, 10–15 cm, thus imparting swinging motion of the lure.

As a fish bites the lure, the line 7 becomes taut and rotation of the spool 6 ceases. The angler pushes the rod back and forth, tensioning and slackening the line 7. This forces the spring 9 of the spool 6 to twist and untwist, assisting in rotation of the spool 6 and winding up of the line 7. The hooked fish is moved towards the angler.

The weight of the spinning reel according to the invention with a line 0.4 mm in diameter and 100 mm long is 204 g.

What is claimed is:

1. An inertia spinning reel comprising: a a body with a base secured to a fishing rod; a spindle fastened in the center of said base; a disc mounted on said spindle; a gear fastened on a side of said disc facing said base; a spring-loaded pawl secured on another side of said disc; a bushing with a toothed flange positioned on said spindle, said toothed flange engaging said pawl; a spool for winding up the line installed on said bushing and provided with a central circular recess accomodating a helical spring, one end of which is connected with said spool and the other end of which is connected with said bushing; and a spring-loaded catch secured on the base and engaging said gear.

2. An inertia spinning reel according to claim 1 wherein the catch is provided with a screw for adjusting the force of the catch spring.

3. An inertia spinning reel according to claim 1 wherein mounted on the base is a spring-loaded stop with a handle and the periphery of the disc is provided with recesses interacting with said stop.

* * * * *